(12) United States Patent
Fisher et al.

(10) Patent No.: US 7,486,745 B2
(45) Date of Patent: Feb. 3, 2009

(54) METHOD FOR IMPROVING MULTIPATH MITIGATOR LOW PATH SEPARATION ERROR BEHAVIOR

(76) Inventors: Benjamin Fisher, 4248 E. Fitzgerald Ave., Orange, CA (US) 92867; Lawrence Weill, 100 Surf Pl., Seal Beach, CA (US) 90740

( * ) Notice: Subject to any disclaimer, the term of this patent is extended or adjusted under 35 U.S.C. 154(b) by 561 days.

(21) Appl. No.: 11/158,137

(22) Filed: Jun. 20, 2005

(65) Prior Publication Data

US 2006/0285609 A1    Dec. 21, 2006

(51) Int. Cl.
*H03K 9/00* (2006.01)

(52) U.S. Cl. .................. 375/316; 375/150; 375/326; 375/341; 375/137; 375/134

(58) Field of Classification Search .......... 375/316, 375/150, 326, 341, 137, 134
See application file for complete search history.

(56) References Cited

U.S. PATENT DOCUMENTS 6,031,881 A * 2/2000 Weill et al. .......... 375/341

* cited by examiner

*Primary Examiner*—Shuwang Liu
*Assistant Examiner*—Kabir A Timory

(57) ABSTRACT

A process is disclosed for discriminating between received ranging signals, such as GPS, GNSS, and radar signals, which arrive via a single path and those which arrive via multiple paths. The number of paths is also estimated. This is accomplished by comparing the residual for an $i^{th}$ order ML estimator of signal time of arrival, where order refers to the number of signal paths for which the estimator is optimal, to a discriminant determined either analytically or empirically and deciding that i distinct signal path components are present in the observation of the signal if for all $k^{th}$ order estimators where $k<i$, the residual is greater than the discriminant for that order estimator and the residual of the $i^{th}$ order estimator is not greater than the discriminant for that order estimator. The invention is particularly useful in obtaining an appropriate signal model for model-based estimation methods.

2 Claims, 10 Drawing Sheets

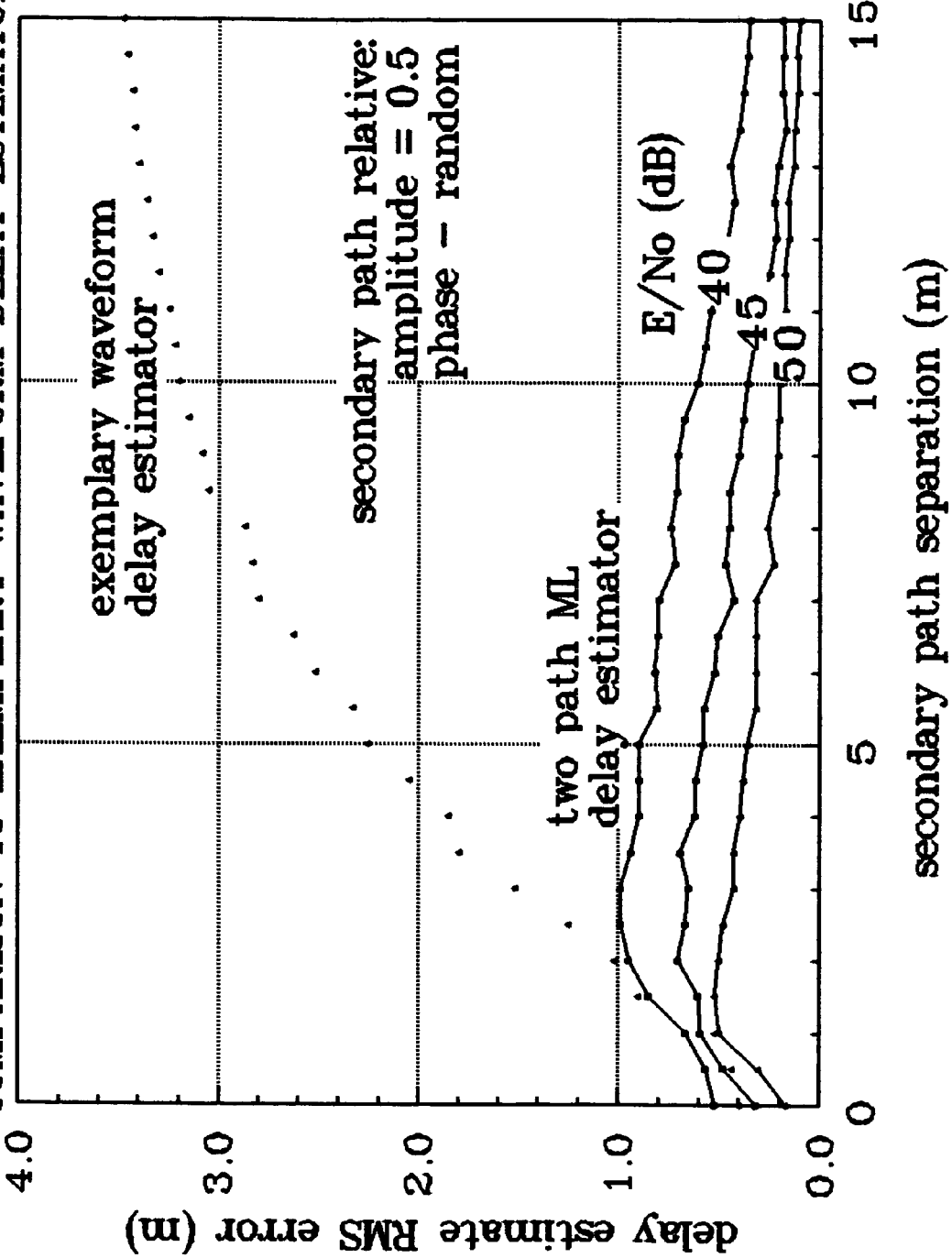

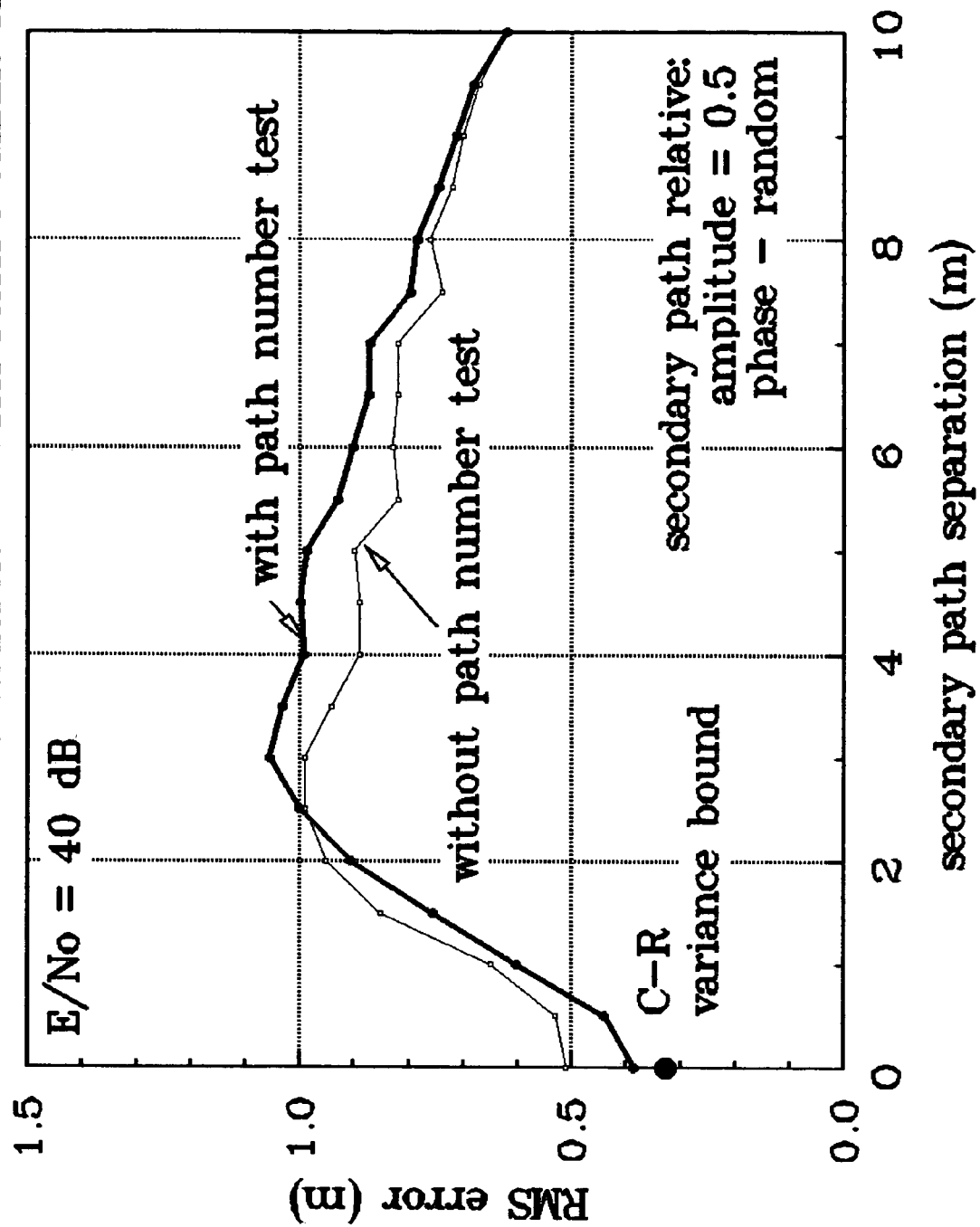
Fig. 2a. – DIRECT PATH DELAY ESTIMATE RMS ERROR FOR TWO PATH ESTIMATOR – WITH PATH NUMBER TEST

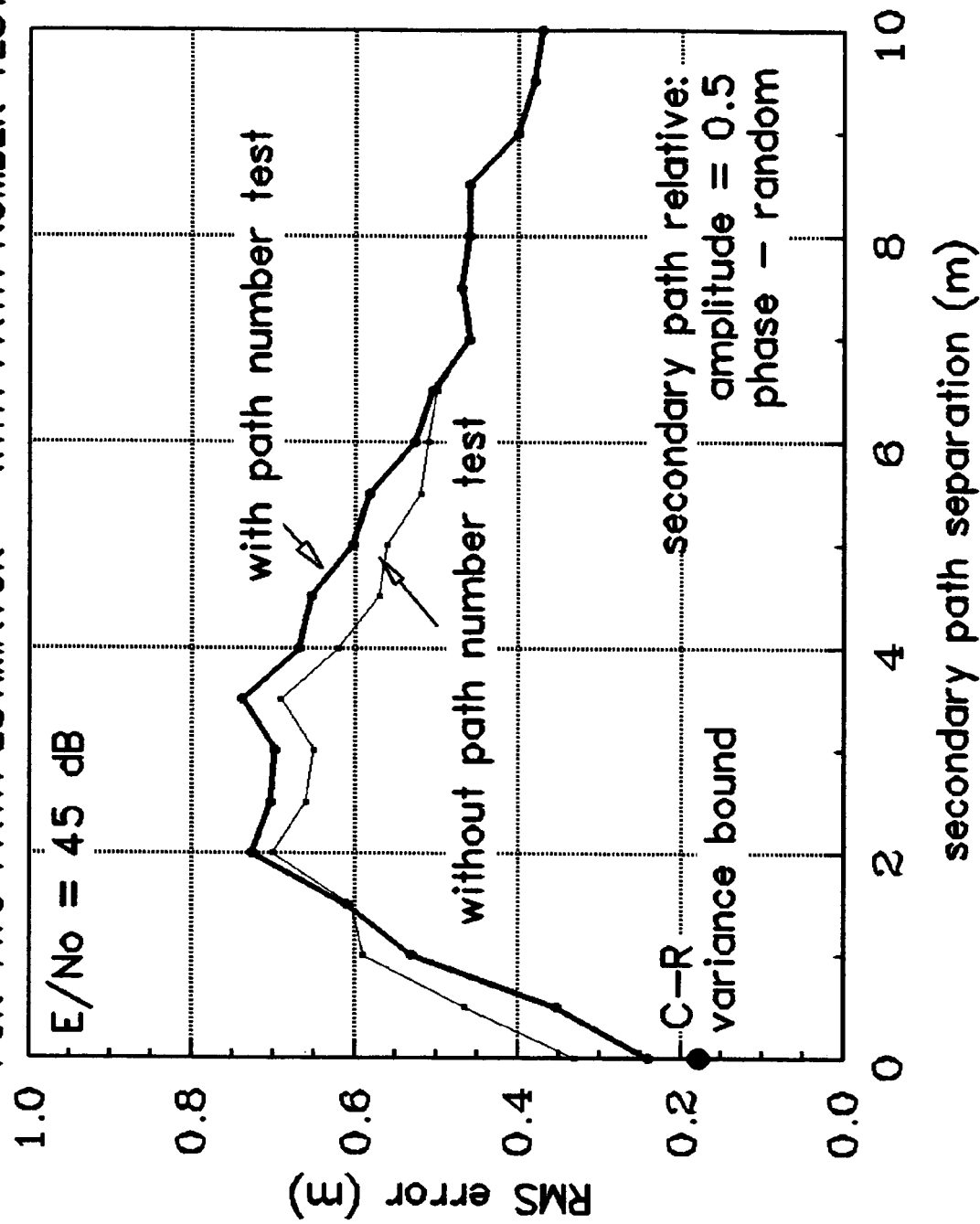

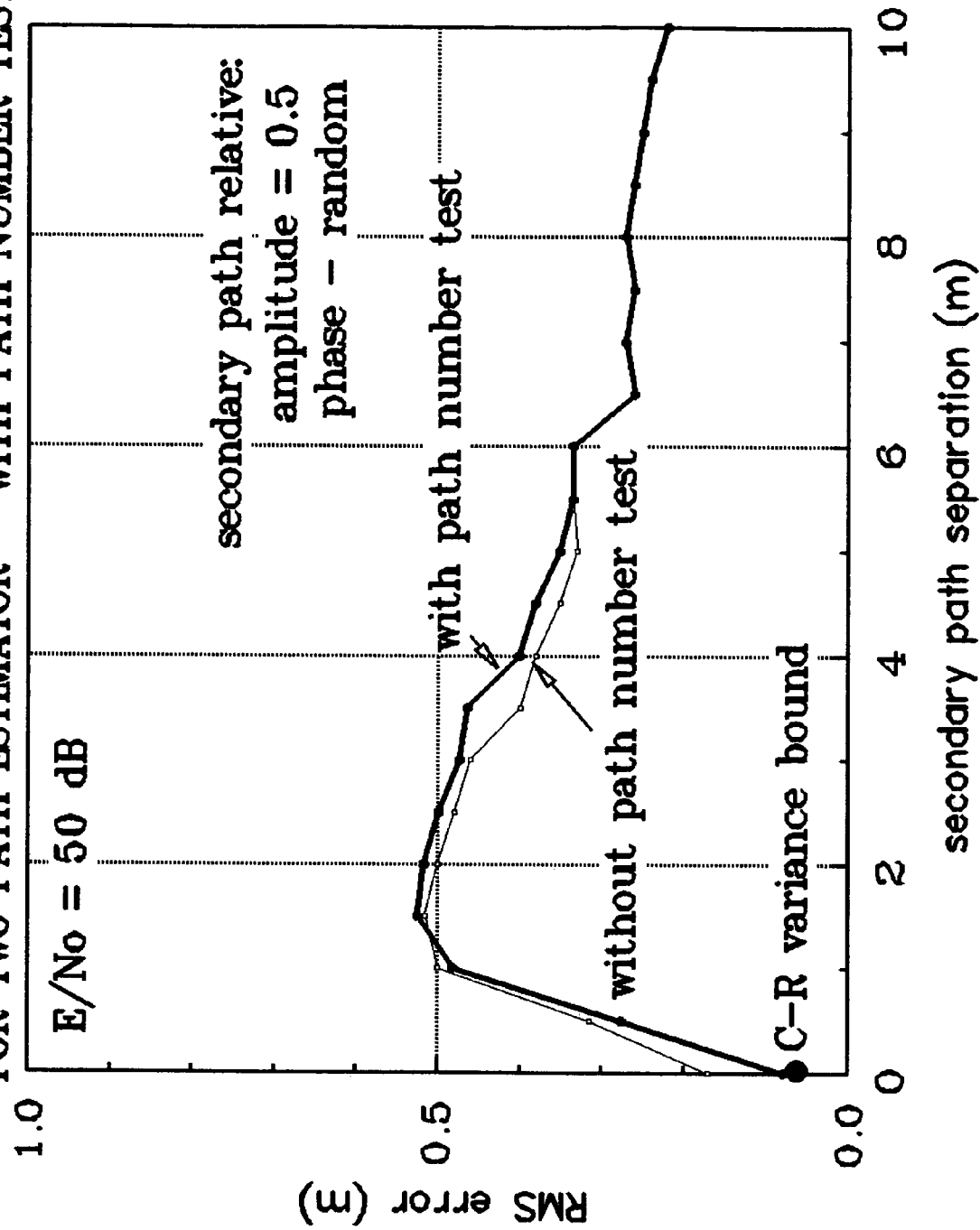

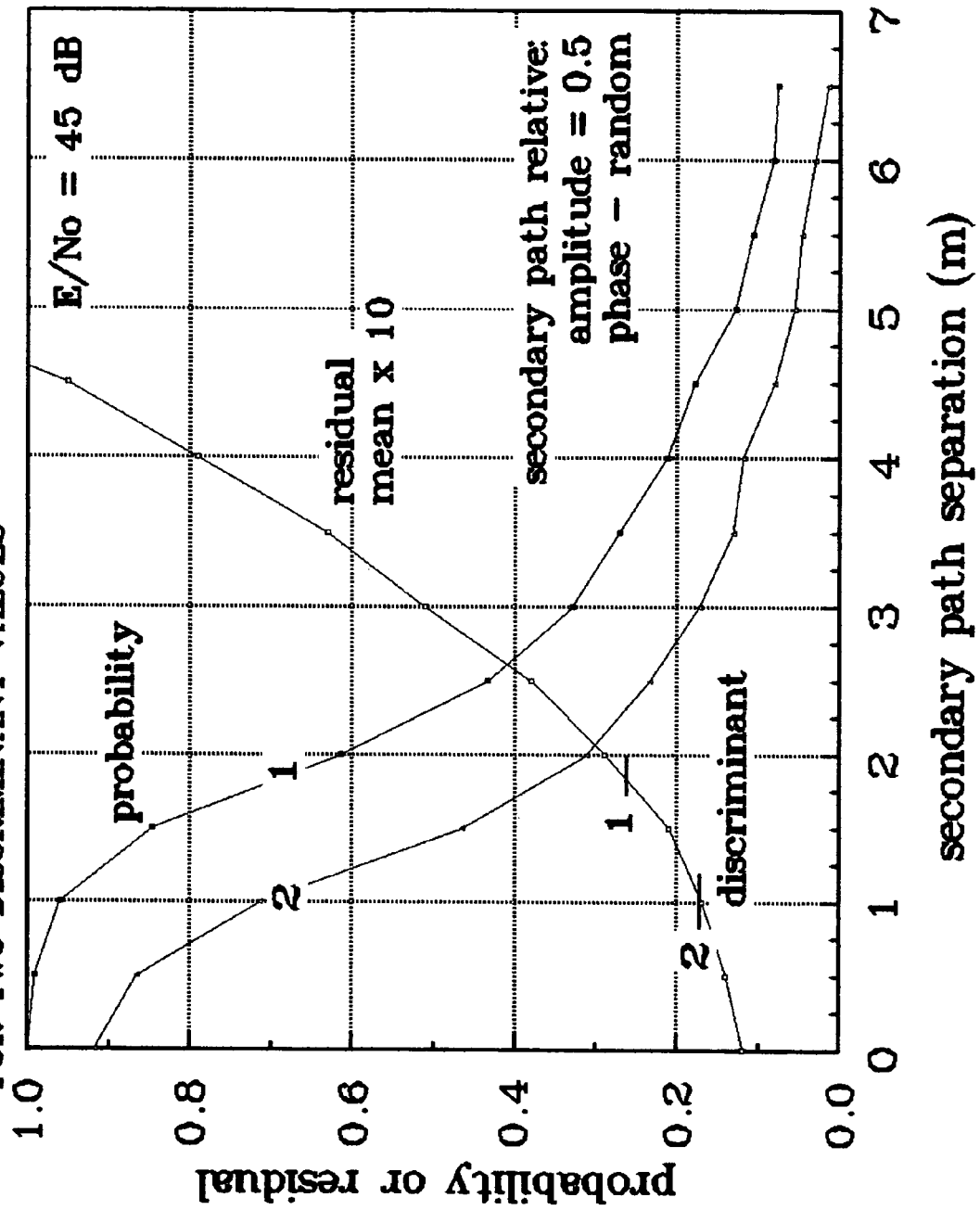
Fig. 3. – OPTIMAL SINGLE PATH DELAY ESTIMATOR WITH TWO SIGNALS – PROBABILITY OF DECIDING ONE SIGNAL IS PRESENT FOR TWO DISCRIMINANT VALUES

METHOD FOR IMPROVING MULTIPATH MITIGATOR LOW PATH SEPARATION ERROR BEHAVIOR

BACKGROUND OF THE INVENTION

1. Field of the Invention

This invention relates to signal transmission ranging systems, such as GPS, radar, sonar, lidar and the like, in which the generally deleterious multiple propagation path (multipath) induced ranging errors are operating. More specifically, this invention provides improvement in ranging error when secondary path signals are not far separated from the direct path signal.

2. Description of Related Art

The direct and each secondary path signal propagated to a signal receiver can be described by three parameters: amplitude, carrier phase, and signal modulation delay. Secondary path signals most generally result from reflections of direct path signals. Reflections are subject to additional propagation loss, delay, and electromagnetic effects (phase shift) characteristic of the reflecting materials. In toto, relative to the direct path signal, reflected signals are observed later in time with generally lower amplitude and with randomized phase. The difference in delay of secondary path signals and the direct path signal is here referred to as "path separation"—always a non-negative quantity. It is cognitively useful to normalize delay difference by multiplying by the speed of signal propagation to refer to path separation in distance (range) units.

It is understood in the art that ranging information is carried by both signal modulation and carrier phase. Carrier phase derived range is ambiguous from wavelength to wavelength. In short wavelength systems, modulation derived range is generally used to assist in resolving this ambiguity. Partly motivated by optimal methods for estimating range from noisy signal observations in systems with a priori information on signal modulation, range is obtained by correlating the received signal envelope with stored and delayed replicas of the signal modulation aligned with the received signal.

There are two methods in use for mitigating degradations in ranging accuracy caused by multiple signal propagation paths. The first, referred to here as the waveform method, uses specially designed waveforms as reference functions for cross-correlating with the received signal envelope. In GPS, as an example of a ranging system, range-to-satellite, referred to as pseudorange, can be measured by correlating the received signal envelope with two chipping sequences each the same as that broadcast by the GPS satellites but separated in time by some fraction of the duration of a chip. The difference in values between the correlation of the chipping sequences and the received signal is a discriminator function which, in a feedback loop referred to as a Delay Lock Loop (DLL), is delayed or advanced in time so that the chipping sequences straddle the received signal, producing a null at the delay or advance constituting the time of signal reception. The presence of multipath in the received signal causes the null to shift. This shift is a ranging error which may be very appreciable depending on the intensity of the multipath signal(s). In fact, multipath induced null shift when secondary path signals of appreciable intensity are observed is typically a dominant ranging error source.

The difference in correlation values between the received signal modulation and two chipping sequences separated by a given time increment can be obtained more directly by correlating the received signal envelope with the difference between these chipping sequences. The correlation of such bipolar functions with the received signal envelope varies from one polarity through a null to the other polarity which provides the DLL with the information needed to accomplish alignment with the received signal. For elaboration on this technique refer to Chapter 4-4 of the book entitled "Telecommunication Systems Engineering" by Lindsey, W. C. and Simon, M. K. published by Prentice-Hall, Inc. 1973 or the paper "Theory and Performance of Narrow Correlator Spacing in a GPS Receiver," Van Dierendonck, et al in Proceedings of the National Technical Meeting, Institute of Navigation, 1992 pp. 115-124.

The bipolar pulses described above are in a sense the simplest of a class of correlator reference waveforms than have been devised to reduce the DLL null shift effect occurring when multipath is present. The reader is referred to U.S. Pat. No. 6,023,489 "Method and Apparatus for Code Synchronization in a Global Positioning System Receiver," R. R. Hatch; and U.S. Pat. No. 6,272,189 "Signal Correlation Techniques for a Receiver of a Spread Spectrum Signal Including a Pseudorandom Noise Code that Reduces Errors when a Multipath Signal is Present," L. Garin et al, for examples of these special waveforms. The somewhat more complex correlator reference waveforms described in these patents operate to provide improved multipath error performance at high path separation. Inherent in the behavior of a delay discriminator these special waveforms can have little to no effect on mitigating the null shift when the shift is small, perhaps less than several meters.

More optimal methods using classical Maximum Likelihood (ML) estimation techniques for mitigating the effects of multipath, in the sense that pseudorange errors are capable of being reduced to near unimprovable low levels when secondary path signals are observed, have been described in the patent records of the U.S. Patent office. This is emphasized by comparing the RMS delay estimate error with an ML estimator to an exemplary waveform delay estimator as displayed in FIG. 1. The reader is referred to U.S. Pat. No. 5,615,232 "Method of Estimating a Line of Sight Signal Propagation Time Using a Reduced Multipath Correlation Function," R. D. J. Van Nee, and U.S. Pat. No. 6,370,207 "Method for Mitigating Multipath Effects in Radio Systems," L. R. Weill, et al for elaboration on ML-based ranging methods. Prior to these inventions ML estimation in the case of multipath signals was infeasible for real-time processing applications. Van Nee forms the correlation of a reference chipping sequence with the received signal modulation. This function is reduced iteratively by estimating signal parameters using a search process for the next most intense secondary path signal remaining on each iteration and subtracting the correlation function estimated with those signal parameters. Weill, et al formulate the likelihood in terms of linearized functions related to the nuisance parameters of the direct and secondary path(s) signal(s) to reduce the ML estimation problem to a search in only the delay parameters of the direct and secondary path(s) signal components. As compared to a search over all the signal parameters, reduced search dimensionality is more rapidly executed by orders of magnitude, and is done in the interest of making feasible real-time ML quality range estimates.

OBJECTS AND SUMMARY OF THE INVENTION

When using either ML method there exist effects at low path separation that may preclude obtaining the best possible results considering all possible estimators. This could be interpreted as a contradiction to the notion that the ML estimator is optimal, but no such contradiction actually exists.

The ML estimator requires a priori knowledge of the signal model. If two signal paths are observed and the model is two signal paths then the two-path ML estimator is optimal. But if only a single path signal is observed then the two-path ML estimator is sub-optimal and will produce estimation results inferior to what otherwise might be obtained. This extends to composite signals with a higher number of secondary path signals. If a two-path signal is observed then inferior estimation results will be obtained with a three path estimator, etc.

When low path separation applies there is ambiguity (ill-conditioning) in the signal model. If a two-path signal, as an example, is observed then, where secondary path separation is small, the ambiguity gives rise to larger pseudorange errors than would be obtained with a single-path estimator. In effect, the ambiguity creates uncertainty in deciding which model best applies from the point of view of least ranging error.

a. The objective of this invention is to provide means to resolve this ambiguity in favor of the most appropriate signal model, in the sense of least ranging error, when low secondary path separation applies.

b. A further objective of the invention is to use this model discrimination result to obtain improved multipath mitigation error behavior, i.e., lower ranging errors, in the low path separation regime.

c. Yet a further objective of the invention is to avoid degrading multipath mitigation error behavior obtained when those results are optimal or near optimal as in the high path separation regime of operation.

In practice, the multi-dimensional delay search described in the several U.S. patents referred to above is performed using numerical means. In broad terms, the objectives described above are accomplished by first reducing the multi-dimensional delay search described to a single path search, finding ML estimates of signal parameters under the assumption that only one signal path is present in the observed signal, determining the residual error that then occurs, and using this residual as a decision statistic to determine if a multi-dimensional signal delay ML search is more appropriate to the signal data observed. This is made possible by calibration of the estimator residual behavior in the signal receiver as dependent on the number of signal paths and path(s) separation. If it is concluded from the first test that a multidimensional search is appropriate then conduct a two-dimensional search. If this test concludes that yet a higher dimensional search is more appropriate then conduct a three dimensional search, and so on, until the decision process terminates in the most appropriate search dimension. Each step at a lower dimension than ultimately required to obtain ML estimates involves a delay search of lower dimension which is orders of magnitude more rapidly executed than higher dimensional delay searches and therefore has only a small effect on the rate at which optimal range estimates can be made. The implementation can be efficient with respect to the program to execute the lower dimension delay search. The same coding structures that provide multi-dimensional ML delay estimation capability are amenable to adaptation to a lesser dimension.

BRIEF DESCRIPTION OF THE DRAWINGS

FIG. 1—Two Dimension ML Delay Estimator RMS Error Behavior Without Model Path Number Test—In Comparison to Exemplary Waveform Delay Estimator.

FIGS. 2a, b, c—Direct Path Delay Estimate RMS Error for Two Path Estimator—With Path Number Test FIG. 3—Optimal Single Path Delay Estimator with Two Signals—Probability of Deciding One Signal is Present for Two Discriminant Values.

DESCRIPTION OF THE PREFERRED EMBODIMENT

Signal Receivers

Figure 4:
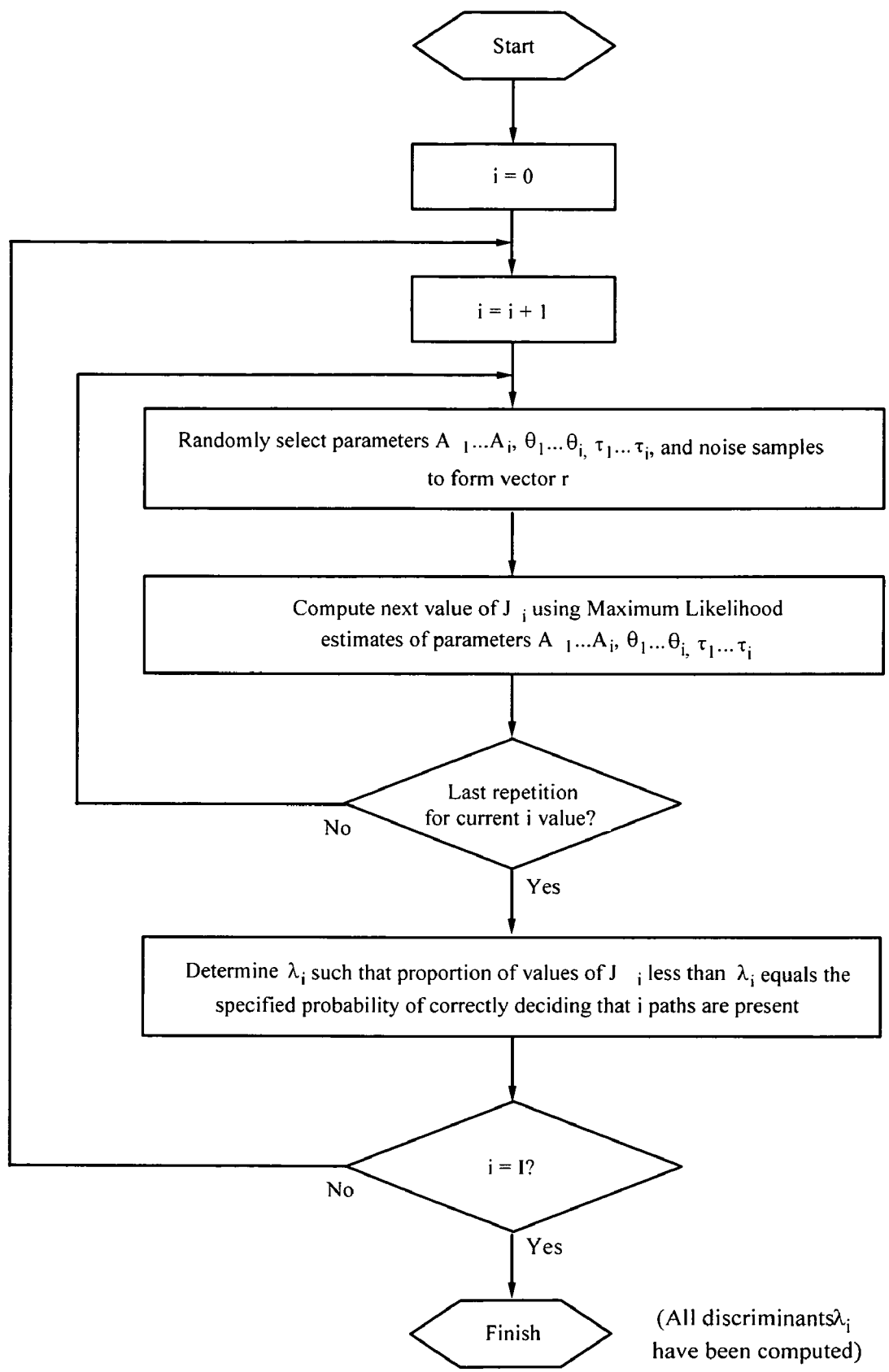
FIG. 4—Method of Obtaining First Type of Discriminant Values.

In the ranging systems' signal receivers contemplated here the received RF (radio frequency or sonic or light frequency) signal is most commonly translated to base-band to obtain a signal with no carrier component. This is done in the interest of minimizing the signal sampling rate needed to preserve the range bearing information carried by the signal envelope. At base-band the received signal r(t) can be written as a composite of the direct and secondary path signal components as $$r(t) = \sum_{i=1}^{I} A_i m(t - \tau_i) e^{j\vartheta_i} + n(t); \ t_0 \le t \le t_0 + T_o, \quad (1)$$

where $A_i$ denotes the amplitude of the $i^{th}=1, \ldots, I$ signal component of the composite received signal, m(t) denotes the signal modulation which is common to all signal components, $\tau_i$ denotes the delay of the $i^{th}=1, \ldots, I$ signal component, $\phi_i$ denotes the carrier phase of the $i^{th}=1, \ldots, I$ signal component, generally considered randomly varying over [0, 2π], and $T_0$ denotes the duration of signal observation. In eq. (1) the various signal paths are not ordered in any particular way. To simplify further considerations without losing generality it is useful to assume that the signal component with amplitude denoted $A_1$, phase $\phi_1$, and delay $\tau_1$ constitutes the direct path signal parameters. The formulation further assumes that Doppler shift of the signal carrier has been removed. Because each signal component is Doppler shifted by different amounts, in general, depending on the propagation medium this is an approximation, but one which often applies closely. Where the approximation is inappropriate eq. (1) may be modified to include a Doppler shift parameter for each signal component. Further, in the formulation of eq. (1) the signal modulation, m(t), is assumed, also without compromising generality, to have a unit power modulus.

n(t) in eq. (1) denotes noise competing with the observed signal. As distinguished from interference and as is well understood in signal receivers noise is a random process which has as its origin the activity of large numbers of electrons internal and external to the receiver and therefore can be characterized as Gaussian (via the central limit theorem) and here assumed stationary (time invariant statistics), over intervals of time of duration at least $T_0$, the signal observation interval.

In ranging systems, the signal modulation, m(t), is often a coded chipping sequence, which is well understood in the art, having the properties of both relatively large signal bandwidth and the potential for a relatively long observation time $T_0$ so as to obtain high signal energy; both properties needed for high ranging accuracy. In general, both r(t) and m(t) are complex valued, the latter arising due to non-linearity of phase shift of the receiving system.

In contemporary receivers of the type here of interest the base-band signal is sampled in preparation for the extraction by numerical means of the ranging information supplied by the received signal. Let $$r = (r_0, r_1, \ldots, r_{N-1})^T \qquad (2)$$

denote a vector of these signal samples; where $r_k = r(t_k)$; $k = 0, \ldots, N-1$. In the instance where signal propagation occurs over multiple propagation paths each of these signal samples depends on the vector of signal parameters $$a = (A_1, A_2, \ldots, A_1, \tau_1, \tau_2, \ldots, \tau_1, \partial_1, \partial_2, \ldots, \partial_1) \qquad (3)$$

corresponding to the various signals observed. Let $$m_i = (m(t_0 - \tau_i), m(t_1 - \tau_i), \ldots, m(t_{N-1} - \tau_i))^T \qquad (4)$$

denote the vector of samples of the modulation of the $i^{th}$ component signal of the observed composite signal. In formulating the ML estimator of the quantity to be maximized the joint density of the signal samples r conditioned on an estimate, denoted here as $\hat{\alpha}$, of the signal parameter vector $\alpha$ is the focus of interest. Let $f_{r|\hat{a}}$ denote the joint density of the signal samples conditioned on the signal parameters, so that an ML estimate of $\alpha$, $\hat{\alpha}_{ML}$, is given by $$\hat{a}_{ML} = \max_{\hat{a}} f_{r|\hat{a}}.$$

The processes mentioned earlier in U.S. Pat. No. 6,370,207 describe an (computationally) efficient method for doing this. Note that $\hat{\alpha}_{ML}$ means all components of the parameter vector $\hat{\alpha}$ are jointly varied until a maximum in $f_{r|\hat{a}}$ is attained.

It is well understood in ranging systems that the ML estimate of the direct path signal delay, $\hat{\tau}_{1ML}$, referred to as pseudorange in GPS, is the information of primary utility since it is basic to fixing position. The other parameters of the signal, while having a role in ML estimation of the direct path signal delay, are not, generally, of the same level of interest. In an estimation problem when certain parameters are of no or little interest often they are referred to as nuisance parameters. Nevertheless, in some applications even in the instances addressed here these so-called nuisance parameters may find particular utility, but this is not the subject matter of this invention.

Based on the previous discussion the elements of the signal vector r are jointly Gaussian with mean $$s = (s(t_0), s(t_1), \ldots, s(t_{N-1}))^T, \qquad (5)$$

where $$s(t_k) = \sum_{i=1}^{I} A_i e^{j\vartheta_i} m(t_k - \tau_i)$$

and with variations given by a vector of complex-valued noise samples $n = (n(t_0), n(t_1), \ldots, n(t_{N-1}))^T$. The superscript T denotes the transpose operator. The matrix $K_n = E[nn^\dagger]$ denotes the covariances of the elements of the noise vector n, † denotes conjugate transpose and $E[\cdot]$ denotes statistical expectation of the quantity in brackets. Encountered in the following is the quantity $$R(\tau_i, \tau_j) = m_i^\dagger K_n^{-1} m_j = \sum_{i=1}^{N} \sum_{j=1}^{N} m_i^*(K_n^{-1})_{ij} m_j \qquad (6)$$

referred to as the noise weighted cross correlation of the $i^{th}$ and $j^{th}$ signal modulation vectors $m_i$, $m_j$. $R(\tau_i, \tau_j)$ will attain a maximum value when the delays $\tau_i$ and $\tau_j$ are equal (i=j) and, most generally, will decrease uniformly as the difference in the delays (path separations), $|\tau_i - \tau_j|$, increases, at least for small path separation.

The Residual

The conditional density $f_{r|\hat{a}}$ is given by $$f_{r|\hat{a}} = \frac{1}{|K_n|} e^{-\left(r - \sum_{i=1}^{I} \hat{A}_i e^{j\hat{\vartheta}_i} m_i\right)^\dagger K_n^{-1} \left(r - \sum_{i=1}^{I} \hat{A}_i e^{j\hat{\vartheta}_i} m_i\right)}. \qquad (7)$$

$f_{r|\hat{a}}$ is a maximum when the vector of parameters, $\hat{\alpha}$, the estimate of $\alpha$, is chosen so that the negative of the exponent of eq. (7)

$$J = \left(r - \sum_{i=1}^{I} \hat{A}_i e^{j\hat{\vartheta}_i} m_i\right)^\dagger K_n^{-1} \left(r - \sum_{i=1}^{I} \hat{A}_i e^{j\hat{\vartheta}_i} m_i\right) \qquad (8)$$

$$= r^\dagger K_n^{-1} r - 2\text{Re}\left[\sum_{i=1}^{I} \hat{A}_i e^{j\hat{\vartheta}_i} r^\dagger K_n^{-1} m_i\right] +$$

$$\sum_{i=1}^{I} \sum_{j=1}^{I} \hat{A}_i \hat{A}_j e^{-j(\hat{\vartheta}_i - \hat{\vartheta}_j)} m_i^\dagger K_n^{-1} m_j$$

is a minimum, where Re[·] denotes real part of the quantity in brackets.

J in eq. (8) is often referred to as the residual. It is expedient to substitute $\alpha_i$ for $A_i \cos(\partial_i)$ and $\beta_i$ for $A_i \sin(\partial_i)$ for $i = 1, \ldots, I$, resulting in $$J = r^\dagger K_n^{-1} r - 2\text{Re}\left[\sum_{i=1}^{I} (\alpha_i + j\beta_i) r^\dagger K_n^{-1} m_i\right] + \qquad (9)$$

$$\sum_{i=1}^{I} \sum_{j=1}^{I} (\alpha_i - j\beta_i)(\alpha_j + j\beta_j) m_i^\dagger K_n^{-1} m_j.$$

For the case of only a single path signal, necessary conditions at the minimum are $$\partial J / \partial \alpha = -2\text{Re}[r^\dagger K_n^{-1} m_1] + 2\alpha m_1^\dagger K_n^{-1} m_1 = 0, \qquad (10a)$$

and $$\partial J / \partial \beta = 2\text{Im}[r^\dagger K_n^{-1} m_1] + 2\beta m_1^\dagger K_n^{-1} m_1 = 0, \qquad (10b)$$

where, to simplify notation, subscripts on $\alpha$ and $\beta$ have been suppressed. Solving for $\alpha$ and $\beta$ and substituting those solutions in eq. (9) produces the residual given by $$^1J_1 = r^\dagger K_n^{-1} r - \frac{|r^\dagger K_n^{-1} m_1|^2}{m_1^\dagger K_n^{-1} m_1}. \qquad (11)$$

where the notation $^1J_1$ denotes the residual for a single path signal optimal delay estimator when only a single path signal is present. $^2J_1$ denotes the residual for this single path optimal delay estimator when two signals are present, and so on. In general, $^1J_i$ means the residual for an $i=1,\ldots,I$ signal path optimal estimator with I signal components present. Sometimes the estimator with the subscript $i=1,\ldots,I$ is referred to as an $i^{th}$ order estimator.

$^1J_1$ has an expected value, or equivalently mean or average value, $E[^1J_1]$, given by $$E[^1J_1] = A_1^2 m_1^\dagger K_n^{-1} m_1 + N - \frac{Tr[K_n^{-1} m_1 m_1^\dagger]}{m_1^\dagger K_n^{-1} m_1}, \qquad (12)$$

where $Tr[\cdot]$, the trace of $[\cdot]$, denotes the sum of the diagonal elements of the matrix of elements inside the brackets. If the observed signal vector is the composite of I signals, I denoting a number greater than one, then the expected value $E[^1J_1]$ of $^1J_1$ (averaging over both noise and signal carrier phase) is given by:

$$E[^1J_1] = \sum_{i=1}^{I} A_i^2 m_i^\dagger K_n^{-1} m_i + N - \frac{\sum_{i=1}^{I} A_i^2 m_i^\dagger K_n^{-1} m_1 m_1^\dagger K_n^{-1} m_i + Tr(m_1 m_1^\dagger K_n^{-1})}{m_1^\dagger K_n^{-1} m_1}. \qquad (13)$$

The difference between $E[^1J_1]$ and $E[^1J_1]$ is the quantity $$E[^1J_1] - E[^1J_1] = \sum_{i=2}^{I} A_i^2 \left( m_i^\dagger K_n^{-1} m_i - \frac{m_i^\dagger K_n^{-1} m_1 m_1^\dagger K_n^{-1} m_i}{m_1^\dagger K_n^{-1} m_1} \right) \qquad (14)$$

$$= \sum_{i=2}^{I} A_i^2 \left( m_i^\dagger K_n^{-1} m_i - \frac{|m_i^\dagger K_n^{-1} m_1|^2}{m_1^\dagger K_n^{-1} m_1} \right).$$

Since both quantities $R(\tau_i,\tau_i) = m_i^\dagger K_n^{-1} m_i$ and $R(\tau_1,\tau_1) = m_1^\dagger K_n^{-1} m_1$ are greater than $|R(\tau_i,\tau_1)| = |m_i^\dagger K_n^{-1} m_1|$, the numerator of the second term of eq. (14), for $i=2, 3, \ldots$ it follows that $$E[^1J_1] - E[^1J_1] > 0; I > 1 \qquad (15)$$

so that, on the average, the residual $^1J_1$ for an optimal single path delay estimator when $I-1 \geq 1$ secondary path signals are present, increases uniformly with an increasing number of secondary path signals. This observation extends so that it can be further stated that the average residual for a two path signal $E[^1J_2]$ increases uniformly with further increasing number of secondary path signals, i.e., for $I>2$, and so on for higher order optimal estimators.

As a second observation, it is noted from eq. (13) written in the form $$E[^1J_1] = \sum_{i=2}^{I} A_i^2 \left( m_i^\dagger K_n^{-1} m_i - \frac{|m_i^\dagger K_n^{-1} m_1|^2}{m_1^\dagger K_n^{-1} m_1} \right) + N - \frac{Tr[K_n^{-1} m_1 m_1^\dagger]}{m_1^\dagger K_n^{-1} m_1}, \qquad (16)$$

that $E[^1J_1]$ increases uniformly as the correlation $m_i^\dagger K_n^{-1} \hat{m}_1$ decreases, i.e., as the path separation(s) $\tau_i - \tau_1$ increase. In the ranging systems of interest here the signal modulation function is so configured that $|R(\tau_i,\tau_1)| = |m_i^\dagger K_n^{-1} \hat{m}_1|$ decreases uniformly with increasing path separation, at least for small path separations.

The process of forming the residual for an optimal signal delay estimator when one or more secondary path signals are present can be generalized from the preceding illustration. In the general case, at the minimum $$\frac{\partial J}{\partial \alpha_i} = -\text{Re}[r^\dagger K_n^{-1} m_i] + \sum_{j=1}^{I} (\alpha_j \text{Re}[m_i^\dagger K_n^{-1} m_j] + \beta_j \text{Im}[m_i^\dagger K_n^{-1} m_j]) \qquad (17a)$$
$$= 0,$$

and $$\frac{\partial J}{\partial \beta_i} = \text{Im}[r^\dagger K_n^{-1} m_i] + \sum_{j=1}^{I} (-\alpha_j \text{Im}[m_i^\dagger K_n^{-1} m_j] + \beta_j \text{Re}[m_i^\dagger K_n^{-1} m_j]) \qquad (17b)$$
$$= 0;$$

$$i = 1,\ldots,I.$$

where $\text{Im}[\cdot]$ denotes imaginary part of the quantity in brackets. Eqs. 17a, and b are a fully specified set of $2 \cdot I$ linear equations in $\alpha_i$ and $\beta_i$ for $i=1,\ldots,I$. Means for numerically solving such systems of equations are well known in the art; analytic methods of accomplishing a solution are impractical. Putting these numerically obtained results in eq. (9) results in the residual which may be minimized by substituting the optimally estimated vector of signal delays using the search methods described in detail in U.S. Pat. No. 6,370,207.

A Test for the Presence of One or More Signal Paths

Note that the computation of $^1J_1$ depends on a priori knowledge of the number, I, of signal propagation paths. This is information most generally not known a priori. As previously stated the subject of this invention is means to determine this information with a sufficiently high probability to obtain enhanced mitigation of multipath induced ranging errors with small path separation secondary path signals.

Let $H_1$ denote the hypothesis that the observed signal r is composed of only a direct path signal. Let $\bar{H}_1$ denote the hypothesis that the observed signal r is composed of a direct path signal and one, or more, secondary path signals, and assume that these events $H_1$, $\bar{H}_1$ are equally probable, which with no further information is a reasonable assumption. In other words without information to the contrary it is equally probable that the observed signal is composed of only a single path signal versus it is a composite of a single path signal plus a number, I−1, of secondary path signals. It is well known in decision theory that a decision test which provides least error is simply: choose the larger of the α posterior probabilities $P_{H_1\backslash r}, P_{\bar{H}_1\backslash r}$. Using Bayes' rule, $$P_{H\backslash r} = \frac{f_{r\backslash H} P_H}{f_r}. \quad (17)$$

Given that the alternative hypotheses $H_1$, $\bar{H}_1$ are equally probable the maximum a posteriori probability occurs when the density $f_{r\backslash a}$ is a maximum under the specified hypothesis since the unconditional density $f_r$ is invariant with respect to the hypothesis. It is not possible a priori to compute $P_{H_1\backslash r}$ since the number of signal paths I is not known, which means that in the absence of additional information it is not possible to carry out the Bayes test as stated. An alternative is provided as follows: if based on the observation r conclude not $H_1$ then decide for the alternative $\bar{H}_1$. This is a feasible test which can be carried out, as follows. For hypothesis $H_1$, corresponding to only a single (direct) path signal, the signal parameter vector $\alpha=(A_1,\tau_1,\partial_1)$ so that using eq. (11) search for the path delay $\tau_1$ that minimizes the residual $^1J_1$ and if that value is greater than what would be obtained if only one signal were present in the observed data, then conclude there is more than one signal path or, conversely, if that value is less than what would be obtained if multiple path signals were present, then conclude there is only a single path signal present.

If it is concluded that (not) more than one signal path is present use a (single) multiple path estimator to estimate the desired ranging information $\tau_1$. If the residual is greater than what corresponds to a single path signal then estimate the parameters $A_1,A_2,\tau_1,\tau_2,\partial_1,\partial_2$ that maximize $f_{r\backslash H_2}$ with a two path ML estimator and if the residual is then greater (less) than what corresponds to a two path signal conclude the signal is composed of (not) more than two signal paths. This is an iterative process that, in principle, can be carried out until it is observed that the residual is less than what would be obtained if that number of signal paths were present. Therefore conclude that the observed signal is composed of one less signal path. This test can be carried out having only a priori knowledge of the growth of the residual for an estimator of one less signal path than concluded is observed. For example, to determine if a two-path signal model applies then examine the residual for a single path optimal estimator. A practical method for maximizing the conditional density $f_{r\backslash H_n}$ for each step of this iterative process has been described in U.S. Pat. No. 6,370,207.

Efficacy of Method of Improving Small Path Separation Multipath Range Estimate

The error performance of a delay estimator can be summarized in terms of the root of the mean of the squared (RMS) error of the estimate. With single path delay estimates it is known in the art that ranging (delay) errors optimally (ML) estimated are unbiased, and in that case the RMS error is equal to the error standard deviation.

A method of displaying the efficacy of the "number-of-signal-paths" test described above can be provided as follows. Using the well known method of Monte Carlo trials, first compute the RMS delay estimate error with the simplest multipath case consisting of a signal composed of two paths, a direct path signal and a single secondary path signal, for different secondary path signal path separations. Repeat these trials when the test described above is operative and compare the RMS delay estimate error to the results first obtained. A comparison of the two RMS errors obtained in this manner will display the enhancement in estimation behavior, if any, when the test is operative. For reference, FIG. 1 displays the pseudorange estimation error behavior for three different values of the ratio of signal energy to noise PSD without the number-of-signal-paths test described here.

For a single path delay estimator there is a well known lower bound on the RMS error. This is referred to as the Cramer-Rao (C-R) lower bound on the delay estimate error variance. RMS error and square root of variance are identical when the estimate is unbiased, which, as mentioned above, applies for a single path ML delay estimator. The C-R bound for complex valued signal data in white noise can be determined from the formula:

$$\sigma_r^2 \geq \frac{N_0}{2\int_0^{T_o}\left|\frac{\partial s(t-\tau)}{\partial \tau}\right|^2 dt}, \quad (18)$$

where $N_0$ is the (one-sided) noise power spectral density competing with the observed signal r(t). With a single path signal s(t) is given by $$s(t)=A_1 m(t-\tau_1)e^{j\partial_1}; 0 \leq t \leq T_o, \quad (19)$$

which is the continuous signal underlying the sampled data of eq. (6), and where, for convenience, $t_0=0$ and $t_{N-1}=T_o$. It is appropriate to use the continuous signal in determining the C-R bound since it carries all the ranging information available without regard to sampling rate considerations. The C-R bound depends on the signal modulation m(t). With GPS, as an example of a ranging system, m(t) is a pseudorandom (PN) sequence of chips each occurring with a uniform duration, $T_c$. The C-R lower bound on the square root of the variance of delay estimate error for that signal modulation is given, closely, by $$\sigma_r \geq \sqrt{\frac{N_0 T_c}{8EW\left(1 - \frac{\sin(2\pi W T_c)}{2\pi W T_c}\right)}}, \quad (20)$$

where $$E = \frac{A^2}{2}T_o$$

is the signal energy and W is the signal receiver bandwidth. The GPS system uses two chipping sequences: one at the frequency 1.023 MHz referred to as C/A code modulation, and one at ten times that rate referred to as P code modulation. For C/A code modulation, the modulation of interest in this writing $$\sigma_i \geq \frac{33}{\sqrt{E_S/N_0}}$$

meters with a receiver bandwidth of 10.23 MHz., a bandwidth in relatively common use in contemporary GPS receivers. With multipath the C-R bound is only appropriate when path separation is zero. With zero path separation secondary path signals are indistinguishable from the direct path signal. FIGS. 2a, b, and c display the C-R bound (eq. (20)) at zero path separation as dependent on the ratio of signal energy to noise PSD, $$\frac{E}{N_0}.$$

A measure of the improvement in direct path delay estimation error due to the use of the path number test described here can be provided by comparing the zero path separation RMS delay estimate error without the test (FIG. 1) to the RMS delay estimate error with the test (FIGS. 2a, b, and c) in comparison to the C-R variance bound. A superior range delay estimator is one that provides near, or at, C-R bound variance estimates at zero path delay with little, or no, degradation of estimation results with high path separation. It is noted from FIGS. 2a, b, and c that the path number test described here provides a decrease in zero path separation RMS delay estimate error relative to the C-R bound of at least 50% accompanied by a lesser increase in RMS delay estimate error over a relatively small high secondary path separation range. Considering the substantial improvement in delay estimate RMS error compared to other contemporary multipath mitigators this relatively small (not greater than approximately 15%) increase in delay estimate RMS error is in effect the cost in error performance of not knowing a priori the number of signal paths in the observed signal.

FIG. 3 elaborates on the mechanism for this improvement. This Figure displays the growth of the mean residual for a single path ML estimator when two signals are present at, as an example, a value of the ratio of signal energy to noise power spectral density, $E/N_0$, of 45 dB. From the Monte Carlo trials used to obtain the mean residual the probability of deciding only one signal is present, $P(H_1)$, is displayed for two values of a discriminant. It is noted that $P(H_1)$ rapidly decreases with increasing secondary path signal separation and for small path separation is near unit in value depending on the discriminant value. It is therefore highly likely that the single path ML estimator result will be used when path separation is small and with a commensurately high likelihood that the two path estimator will be used when path separation is large. This result is generalizable. With a two path ML estimator the residual increases with the presence of a third signal separated in delay from either the direct or secondary path signal with a commensurate increase in probability of deciding more than one secondary path signal is present, and so on for higher order ML estimators.

Detailed Description of Methods to Obtain and Use Path Number Discriminants

The invention consists of methods for obtaining and using two types of discriminants to decide how many signal paths are present in accordance with the general approach previously described.

Figure 5:
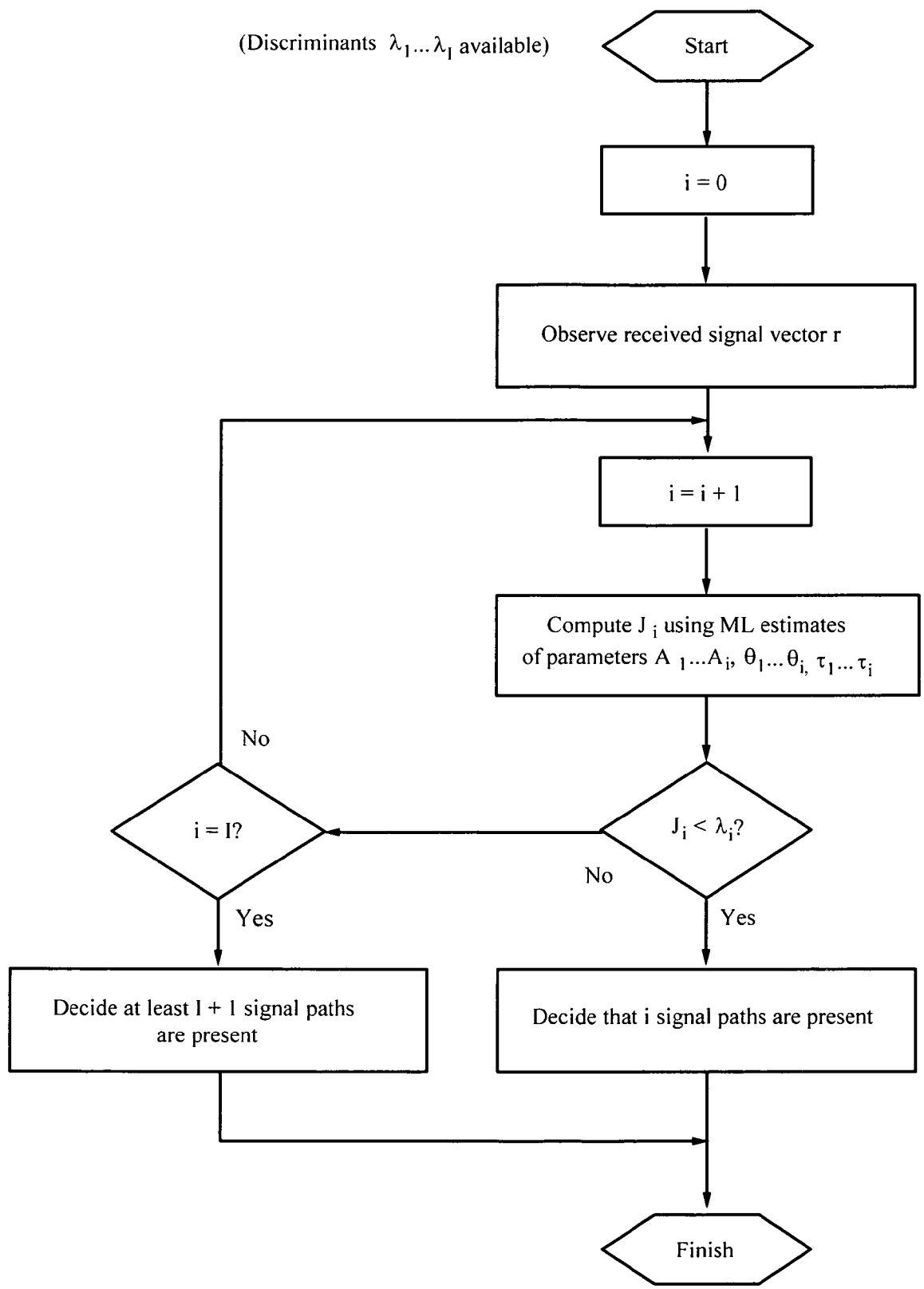
FIG. 5—Method of Using First Type of Discriminant Values to Decide How Many Signal Paths are Present.

FIG. 4 shows a method of obtaining a set of discriminants of the first type, which consists of the following steps:

1a. Generate a first path number discriminant by repeatedly forming the quantity $J_1=(r-A_1 e^{j\Theta_1} m_1)^\dagger K_n^{-1}(r-A_1 e^{j\Theta_1} m_1)$, where the superscript † denotes conjugate transpose, where $r=(r(t_0), r(t_2), \ldots r(t_{N-1}))^T$ denotes a column vector of samples of a ranging receiver signal taken over an interval of duration $T_0=t_{N-1}-t_0$ which is a composite of: i) the vector of samples of a direct path signal envelope $A_1 e^{j\Theta_1} m_1 (t-\tau_1)$, where $A_1$ denotes the direct path signal amplitude, $\theta_1$ denotes the direct path signal carrier phase, and $\tau_1$ denotes the direct path signal delay; all of which are a priori unknown, and where the power of the modulation signal m(t) from which the signal envelope samples $m_1=(m(t_0-\tau_1)m(t_1-\tau_1), \ldots, m(t_{N-1}-\tau_1))^T$ are derived is of unit value, and ii) if secondary path signals are present in r a vector composed of the corresponding samples of one or more secondary path signals $$\sum_{i=2}^{I} A_i e^{j\theta_i} m_i,$$

each such signal delayed from the direct path signal and with an amplitude, phase shift, and delay denoted by $A_i$, $\theta_i$, and $\tau_i$; i=2, . . . ,I respectively, all these quantities also unknown a priori, and with signal envelope samples $m_i=(m(t_0-\tau_i), m(t_1-\tau_i), \ldots, m(t_{N-1}-\tau_i))^T$ derived from the identical modulation signal envelope m(t), and where the number of secondary signal paths I−1 is also a priori unknown, and iii) a vector of samples of competing zero-mean Gaussian noise with covariance matrix $K_n$, with a priori known statistics;

1b. on each repetition in step 1a, generate a new vector r using independently selected random values for the amplitude $A_1$, phase $\theta_1$, delay $\tau_1$, and the vector of Gaussian noise samples, and in forming $J_1$ use the Maximum Likelihood (ML) estimates of the signal parameters $\alpha=(A_1,\theta_1,\tau_1)$;

1c. use the resulting values of $J_1$, one value being generated per repetition, to determine a discriminant value $\lambda_1$ such that the proportion of generated values of $J_1$ which are less than $\lambda_1$ is a specified value referred to as the probability of correctly deciding a single path signal is present in the observation vector r;

1d. for each i, i=2, . . . ,I, where I≧2 is arbitrary, generate an $i^{th}$ path number discriminant by repeatedly forming the quantity $$J_i = \left(r - \sum_{k=1}^{i} A_k e^{j\theta_k} m_k\right)^\dagger K_n^{-1}\left(r - \sum_{k=1}^{i} A_k e^{j\theta_k} m_k\right)$$

with r the composite of a direct path signal and i−1 secondary path signals as described in Step 1a with amplitude $A_k$, phase $\theta_k$, and delay $\tau_k$ relative to the direct path signal for k =2, . . . ,i, and the vector of Gaussian noise samples randomly selected on each repetition, and in forming $J_i$ use the Maximum Likelihood estimates of the direct and secondary signal parameters $A_1, A_2, \ldots A_i, \theta_1, \theta_2, \ldots, \theta_i, \tau_1, \tau_2, \ldots, \tau_i$;

1e. for each i, i =2, . . . ,I, use the resulting values of $J_i$, one value being generated per repetition, to determine a discriminant value $\lambda_i$, such that the proportion of generated values of $J_i$ which are less than $\lambda_i$ is a specified value referred to as the probability of correctly deciding that i−1 secondary path signals are present in the observation vector r;

FIG. 5 shows the method of using the discriminants of the first type to decide how many signal paths are present, as follows:

1f. on observing a received signal vector r carry out a test for the number of signal paths by first forming $J_1=(r-A_1 e^{j\Theta_1} m_1)^\dagger K_n^{-1}(r-A_1 e^{j\Theta_1} m_1)$ where $A_1$, $\theta_1$, and $\tau_1$ are the Maximum Likelihood (ML) estimates of single path signal parameters, and if $J_1$ is less than $\lambda_1$ as determined in Step 1c., decide there is not present one or more secondary path signals in the received signal vector r and terminate the test procedure; alternatively, if $J_1$ is greater than $\lambda_1$ form $J_2$ as specified in Step 1d. and if $J_2$ is not greater than $\lambda_2$ as specified in Step 1e, terminate the test procedure with the conclusion there is one secondary path signal present in the composite received signal vector r; but if $J_2$ is greater than $\lambda_2$ then form $J_3$ and if $J_3$ is less than $\lambda_3$ terminate the procedure with the conclusion that the composite received signal vector r consists of two secondary path signals, or if $J_3$ is greater than $\lambda_3$ continue the test procedure, and on continuing repeat these steps until $J_i$ is less than $\lambda_i$ given that $J_{k-1}$ is greater than $\lambda_{k-1}$ for each $k=1,\ldots,i$ and terminate the test with the conclusion there are $i-1$ secondary path signals present in the composite received signal vector r, where i ranges from 1 to as many as I.

Figure 6A:
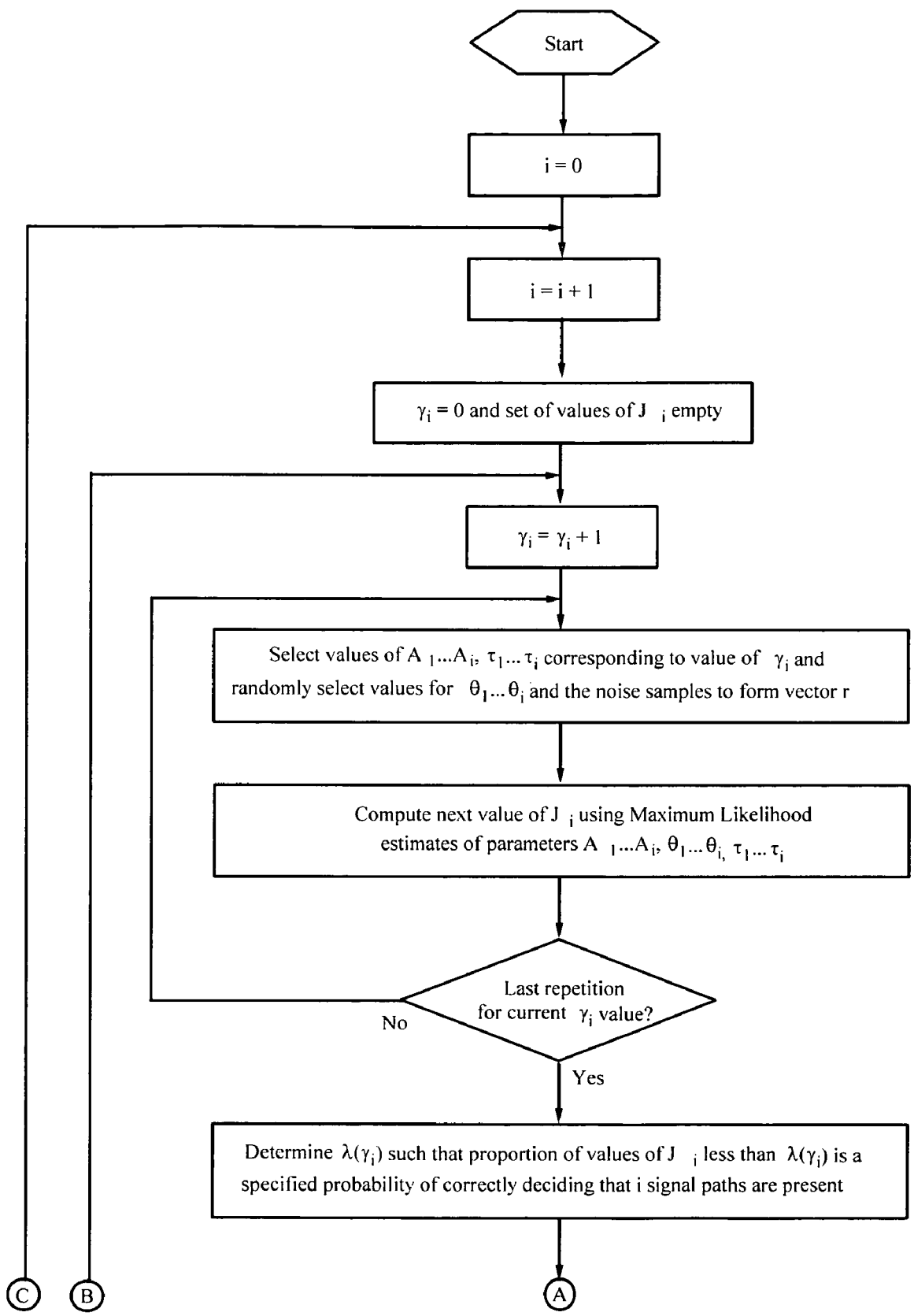
FIG. 6a, b—Method of Obtaining Second Type of Discriminant Values.
Figure 6B:
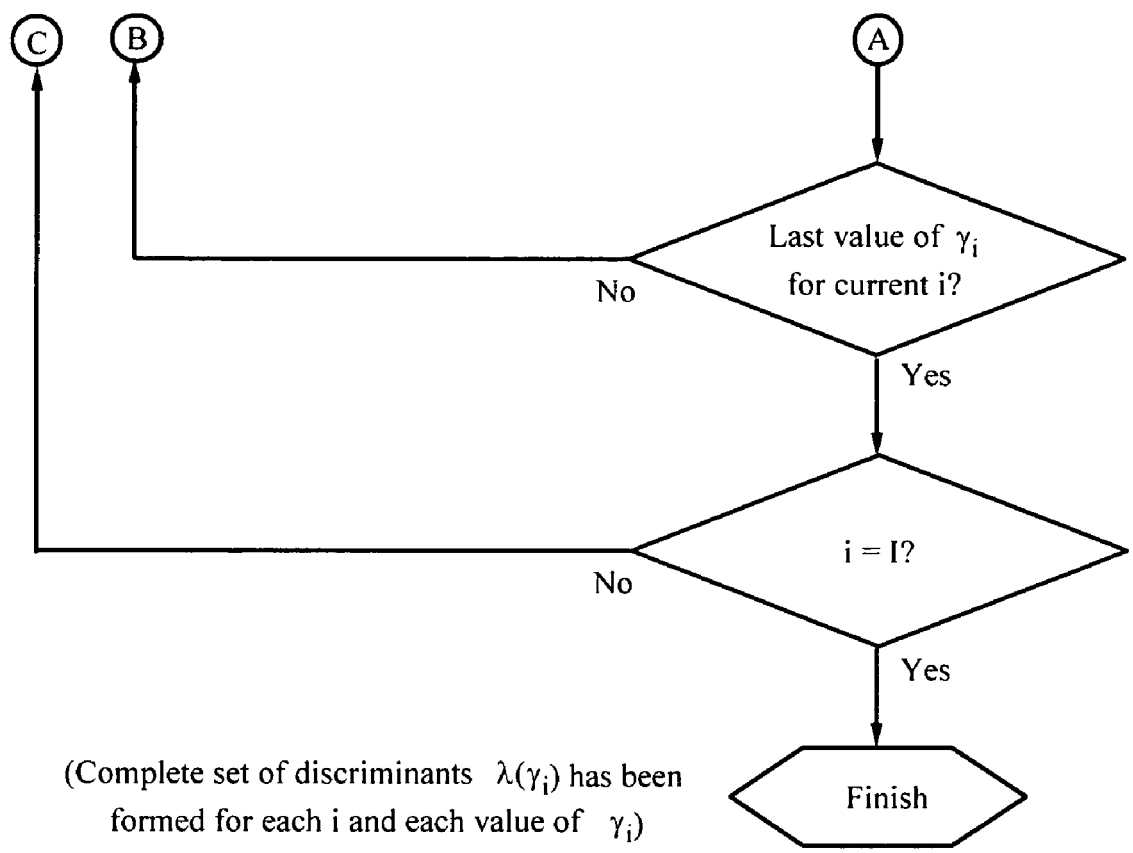
Figure 7:
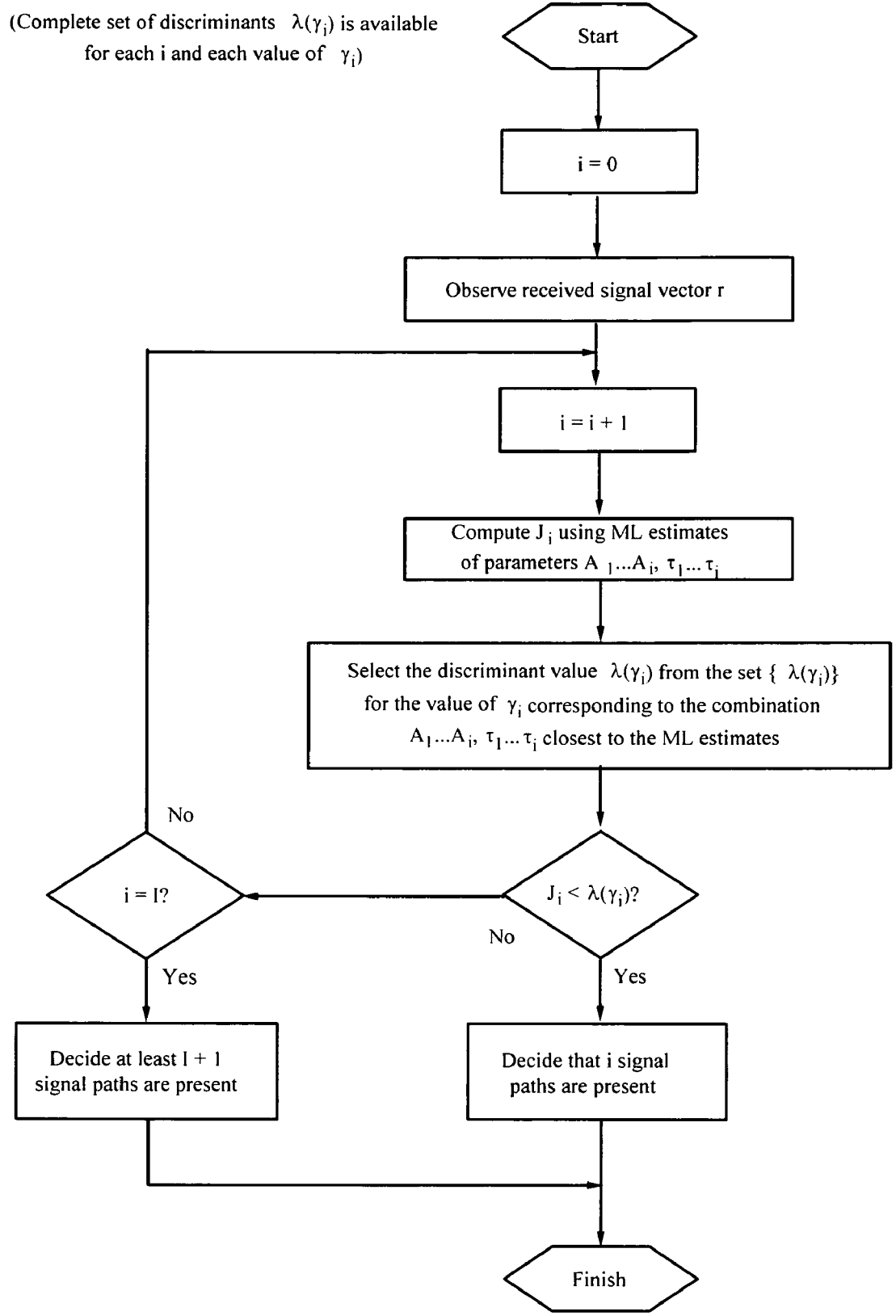
FIG. 7—Method of Using Second Type of Discriminant Values to Decide How Many Signal Paths are Present.

FIGS. 6a, b show a method of obtaining a set of discriminants of the second type, as follows:

2a. for each $i, i=1,\ldots,I$ generate a set of $i^{th}$ path number discriminants by incrementally increasing the amplitude $A_k$ and delay $\tau_k$ of path $k, k=1,\ldots,i$, from a minimum value $A_{k1}$ and $\tau_{k1}$, respectively, to a maximum value $A_{kM}$ and $\tau_{kN}$, respectively, where each of these combinations of amplitude and delay over paths 1 to i can be denoted uniquely by a number $\gamma_i$ which ranges from 1 to $(MN)^i$, and for each combination of values of the parameters $A_1, A_2,\ldots,A_i, \tau_1, \tau_2,\ldots,\tau_i$ defined by the number $\gamma_i$ repeatedly compute the quantity $$J_i = \left(r - \sum_{k=1}^{i} A_k e^{j\theta_k} m_k\right)^\dagger K_n^{-1} \left(r - \sum_{k=1}^{i} A_k e^{j\theta_k} m_k\right),$$

each time using random values of phases $\phi_1, \phi_2,\ldots,\phi_i$ and random Gaussian noise samples to determine a set of $i^{th}$ path number discriminants as the set of values $\lambda(\gamma_i)$ such that for each value the proportion of generated values of $J_i$ which are less than $\lambda(\gamma_i)$ is a specified probability of correctly deciding that $i-1$ secondary path signals are present in the observation vector r when the combination $A_1, A_2,\ldots,A_i, \tau_1, \tau_2,\ldots,\tau_i$, amplitude and delay parameters of that signal are those specified by the value of $\gamma_i$;

FIG. 7 shows the method of using the discriminants of the second type to decide how many signal paths are present, as follows:

2b. on observing a received signal vector r carry out a sequence of tests for the number of signal paths, for the $i^{th}$ test the form the quantity $$J_i = \left(r - \sum_{k=1}^{i} A_k e^{j\theta_k} m_k\right)^\dagger K_n^{-1} \left(r - \sum_{k=1}^{i} A_k e^{j\theta_k} m_k\right)$$

where $A_1, A_2,\ldots,A_i, \tau_1, \tau_2,\ldots,\tau_i$ are the Maximum Likelihood (ML) estimates of the signal parameters for an i-path estimator, select the discriminant value from the set $\lambda(\gamma_i)$ for the value of $\gamma_i$ corresponding to the combination $A_1, A_2,\ldots,A_i, \tau_1, \tau_2,\ldots,\tau_i$ closest to the Maximum Likelihood estimates, and terminate the testing by deciding that there are $i-1$ secondary path signals present in the observed signal r if $J_i$ is less than $\lambda(\gamma_i)$ provided that $J_k$ is greater than $\lambda(\gamma_k)$ for each $k<i$; otherwise perform the next test $i+1$.

What is claimed is:

1. Method of receiving a ranging signal in a receiving device for forming a path number discriminant that can be used to conclude with least error the presence of one or more secondary path signals in an observation of a received signal in a ranging receiver, comprising the following steps:

(a) in the receiving device, generating a first path number discriminant by repeatedly forming a quantity $J_1 = (r - A_1 e^{j\Theta_1} m_1)^\dagger K_n^{-1}(r - A_1 e^{j\Theta_1} m_1)$, where $J_1$ is a positive real value, where the superscript † denotes conjugate transpose, where $K_n^{-1}$ is the inverse of the noise covariance matrix, where $r = (r(t_0), r(t_2),\ldots r(t_{N-1}))^T$ denotes a column vector of N complex-valued samples of a ranging receiver signal taken over a time interval of duration $T_o = t_{N-1} - t_0$, N a positive integer and real-valued t denoting time, which is a composite of:

i) the column vector of samples of a direct path signal envelope $A_1 e^{j\Theta_1} m_1(t-\tau_1)$, where $A_1$ is a positive real value denoting a direct path signal amplitude, $\theta_1$ denotes a direct path signal carrier phase, and $\tau_1$ denotes a direct path signal delay, all of which are a priori unknown, and where a complex-valued modulation signal m(t) from which a vector of signal envelope samples $m_1 = (m(t_0 - \tau_1), m(t_1 - \tau_1),\ldots, m(t_{N-1} - \tau_1))^T$ is derived has a power of unit value, and ii) if secondary path signals are present in r, a vector composed of the corresponding samples of one or more secondary path signals $$\sum_{i=2}^{I} A_i e^{j\theta_i} m_i,$$

each such signal delayed from the direct path signal and with an amplitude, phase shift, and delay denoted by $A_i$, $\theta_i$, and $\tau_i$, $i=2,\ldots,I$ respectively, where I is an integer greater than or equal to 2, all these quantities also unknown a priori, and with signal envelope samples $m_i = (m(t_0 - \tau_i), m(t_1 - \tau_i),\ldots, m(t_{N-1} - \tau_i))^T$ derived from the complex-valued modulation signal envelope m(t), and where a number I−1 of secondary signal paths is also a priori unknown, and iii) a vector of samples of competing zero-mean Gaussian noise with real-valued covariance matrix $K_n$ with a priori known statistics;

(b) on each repetition in Step (a), generating a new vector r using independently selected random values for the amplitude $A_1$, phase $\theta_1$, delay $\tau_1$, and the vector of samples of competing zero-mean Gaussian noise, and in forming $J_1$ use a Maximum Likelihood (ML) estimate of the direct path signal parameters $\alpha = (A_1, \theta_1, \tau_1)$;

(c) using the resulting values of $J_1$, one value being generated per repetition, to determine a discriminant value $\lambda_1$, where $\lambda_1$ is a positive real value, such that a proportion of generated values of $J_1$ which are less than $\lambda_1$ is a specified value referred to as a probability of correctly deciding a single path signal is present in an observation vector r;

(d) for each i, $i=2,\ldots,I$, where $I \geq 2$, generating an $i^{th}$ path number discriminant by repeatedly forming the quantity $$J_i = \left(r - \sum_{k=1}^{i} A_k e^{j\theta_k} m_k\right)^\dagger K_n^{-1} \left(r - \sum_{k=1}^{i} A_k e^{j\theta_k} m_k\right)$$

with r a composite of the direct path signal and i−1 secondary path signals as described in Step (a) with an amplitude $A_k$, a phase $\theta_k$, and a delay $\tau_k$ relative to the direct path signal for k=2, . . . ,i, and the vector of samples of competing zero-mean Gaussian noise randomly selected on each repetition, and in forming $J_i$ use the Maximum Likelihood (ML) estimates of the direct path signal and the secondary path signal parameters $A_1, A_2, \ldots A_i, \theta_1, \theta_2, \ldots, \theta_i, \tau_1, \tau_2, \ldots, \tau_i$;

(e) for each i, i=2, . . . ,I, using the resulting values of $J_i$, one value being generated per repetition, to determine a positive real-valued discriminant value $\lambda_i$ such that a proportion of generated values of $J_i$ which are less than $\lambda_i$ is a specified value referred to as a probability of correctly deciding that i−1 secondary path signals are present in the observation vector r;

(f) on observing a received signal vector r carrying out a test for the number of signal paths by first forming $J_1 = (r - A_1 e^{j\theta_1} m_1)^\dagger K_n^{-1} (r - A_1 e^{j\theta_1} m_1)$ where $A_1$, $\theta_1$, and $\tau_1$ are the Maximum Likelihood (ML) estimates of single path signal parameters, and if $J_1$ is less than $\lambda_1$ as determined in Step (c), decide that one or more secondary path signals are not present in the received signal vector r and terminate the test procedure;

alternatively, if $J_1$ is greater than $\lambda_1$ form $J_2$ as specified in Step (d) and if $J_2$ is not greater than $\lambda_2$ as specified in Step (e), terminate the test procedure with the conclusion there is one secondary path signal present in the composite received signal vector r;

if $J_2$ is greater than $\lambda_2$ then form $J_3$ and if $J_3$ is less than $\lambda_3$ terminate the procedure with the conclusion that the composite received signal vector r consists of two secondary path signals, or if $J_3$ is greater than $\lambda_3$ continue the test procedure, and on continuing repeat these steps until $J_i$ is less than $\lambda_i$ given that $J_{k-1}$ is greater than $\lambda_{k-1}$ for each k=1, . . . ,i and terminate the test with the conclusion there are i−1 secondary path signals present in the composite received signal vector r, where i ranges from 1 to as many as I.

2. Method of receiving a ranging signal in a receiving device for forming a path number discriminant that can be used to conclude with least error the presence of one or more secondary path signals in an observation of a received signal in a ranging receiver, comprising the following steps:

(a) in the receiving device, for each i, i=1, . . . ,I, where I a positive integer, generating a set of $i^{th}$ path number discriminants by incrementally increasing a positive real-valued amplitude $A_k$ and a delay $\tau_k$ of path k, k=1, . . . ,i, from a minimum value $A_{k1}$ and $\tau_{k1}$, respectively, to a maximum value $A_{kM}$ and $\tau_{kN}$, respectively, where M and N are positive integers, and where each of these combinations of amplitude and delay over paths 1 to i can be denoted uniquely by a positive integer $\gamma_i$ which ranges from 1 to $(MN)^i$, and for each combination of values of the parameters $A_1, A_2, \ldots, A_i, \tau_1, \tau_2, \ldots, \tau_i$ defined by the number $\gamma_i$ repeatedly compute a quantity $$J_i = \left(r - \sum_{k=1}^{i} A_k e^{j\theta_k} m_k\right)^\dagger K_n^{-1} \left(r - \sum_{k=1}^{i} A_k e^{j\theta_k} m_k\right),$$

where $J_i$ is a positive real value and where $m_k$ is a kth sample of a known complex-valued modulation signal m(t), each time using random values of phases $\theta_1, \theta_2, \ldots, \theta_i$ and random Gaussian noise samples to determine a set of $i^{th}$ path number discriminants as a set of positive real values $\lambda(\gamma_i)$ such that for each value a proportion of generated values of $J_i$ which are less than $\lambda(\gamma_i)$ is a specified probability of correctly deciding that i−1 secondary path signals are present in an observation vector r when the combination $A_1, A_2, \ldots, A_i, \tau_1, \tau_2, \ldots, \tau_i$ amplitude and delay parameters of that signal are those specified by the value of $\gamma_i$;

(b) on observing a received signal vector r, carrying out a sequence of tests for the number of signal paths, for the $i^{th}$ test the form a quantity $$J_i = \left(r - \sum_{k=1}^{i} A_k e^{j\theta_k} m_k\right)^\dagger K_n^{-1} \left(r - \sum_{k=1}^{i} A_k e^{j\theta_k} m_k\right)$$

where $A_1, A_2, \ldots, A_i, \tau_1, \tau_2, \ldots, \tau_i$ are Maximum Likelihood (ML) estimates of signal amplitude and signal delay parameters for an i-path estimator, and where $\theta_1, \theta_2, \ldots, \theta_i$ are unknown phases of i signal paths, select the discriminant value from the set of values $\lambda(\gamma_i)$ from Step (a) for the value of $\gamma_i$ corresponding to the combination of values $A_1, A_2, \ldots, A_i, \tau_1, \tau_2, \ldots, \tau_i$ from Step (a) closest to the Maximum Likelihood (ML) estimates, and terminate the testing by deciding that there are i−1 secondary path signals present in the observed received signal vector r if $J_i$ is less than $\lambda(\gamma_i)$ provided that $J_k$ is greater than $\lambda(\gamma_k)$ for each k<i, otherwise perform the next test i+1.

* * * * *